US009430226B2

(12) United States Patent
Fujii

(10) Patent No.: US 9,430,226 B2
(45) Date of Patent: Aug. 30, 2016

(54) MOBILE INFORMATION TERMINAL HAS REPLACEMENT PORTION PERFORMING REPLACEMENT PROCESSING FOR MOVING TEMPORARY SETTING DATA TO STORAGE DEVICE

(71) Applicant: KONICA MINOLTA, INC., Chiyoda-ku (JP)

(72) Inventor: Masato Fujii, Nagaokakyo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 292 days.

(21) Appl. No.: 14/023,562

(22) Filed: Sep. 11, 2013

(65) Prior Publication Data
US 2014/0082347 A1 Mar. 20, 2014

(30) Foreign Application Priority Data

Sep. 14, 2012 (JP) ................................ 2012-202295

(51) Int. Cl.
*G06F 9/00* (2006.01)
*G06F 9/44* (2006.01)
(Continued)

(52) U.S. Cl.
CPC ............. *G06F 8/70* (2013.01); *G06F 9/44505* (2013.01); *H04L 67/306* (2013.01)

(58) Field of Classification Search
CPC .... G06F 9/44; G06F 9/44505; G06F 9/4451; G06F 8/70; H04L 67/306
USPC ....................................................... 713/100
See application file for complete search history.

(56) References Cited

U.S. PATENT DOCUMENTS 6,161,176 A * 12/2000 Hunter et al. .......... G06F 9/455
713/1
6,182,212 B1 * 1/2001 Atkins et al. ........... G06F 9/455
713/1
(Continued)

FOREIGN PATENT DOCUMENTS

CN 102143493 A 8/2011
JP 5-40643 A 2/1993
(Continued)

OTHER PUBLICATIONS

Japanese Office Action (Notification of Reasons for Refusal) dated Jul. 29, 2014, issued in corresponding Japanese Patent Application No. 2012-202295 and an English translation thereof. (9 pgs).

(Continued)

*Primary Examiner* — Chun Cao
(74) *Attorney, Agent, or Firm* — Buchanan Ingersoll & Rooney PC

(57) ABSTRACT

A mobile information terminal includes a normal setting data storage portion configured to store temporary setting data in advance as normal setting data that is related to settings; a separate setting data storage portion configured to store, for each user, separate setting data that is related to individual settings in association with an identifier of each user; a control portion configured to perform specific processing based on the normal setting data stored in the normal setting data storage portion; a receiving portion configured to receive the identifier; and a replacement portion configured to perform replacement processing for moving the temporary setting data to a save storage portion and storing into the normal setting data storage portion, as the normal setting data, the separate setting data stored in association with the identifier received by the receiving portion.

20 Claims, 19 Drawing Sheets

(51) Int. Cl.
*H04L 29/08* (2006.01)
*G06F 9/445* (2006.01)

(56) References Cited

U.S. PATENT DOCUMENTS

| | | | |
|---|---|---|---|
| 6,684,259 B1 | 1/2004 | Discavage et al. | |
| 8,984,008 B2* | 3/2015 | Hackborn et al. | G06F 17/30386 707/781 |
| 2003/0027528 A1 | 2/2003 | Hagiwara et al. | |
| 2004/0103274 A1* | 5/2004 | Shih-Chieh | G06F 9/4451 713/2 |
| 2006/0264234 A1 | 11/2006 | Akama | |
| 2008/0109886 A1 | 5/2008 | Matsumoto et al. | |
| 2008/0215794 A1 | 9/2008 | Ishii et al. | |
| 2009/0122358 A1* | 5/2009 | Moore | H04N 1/0035 358/473 |
| 2010/0214604 A1 | 8/2010 | Hosono et al. | |
| 2011/0288874 A1* | 11/2011 | Hinkamp | G06F 19/322 705/1.1 |
| 2012/0057180 A1* | 3/2012 | Lee | G06F 21/608 358/1.13 |
| 2012/0287056 A1* | 11/2012 | Ibdah | G06F 3/04886 345/173 |

FOREIGN PATENT DOCUMENTS

| | | | |
|---|---|---|---|
| JP | 11-513822 | A | 11/1999 |
| JP | 2001273121 | A | 10/2001 |
| JP | 2002-288355 | A | 10/2002 |
| JP | 2003-051909 | A | 2/2003 |
| JP | 2005-252610 | A | 9/2005 |
| JP | 2005267307 | A | 9/2005 |
| JP | 2005-271478 | A | 10/2005 |
| JP | 2005-275961 | A | 10/2005 |
| JP | 2006-324950 | A | 11/2006 |
| JP | 2008-217264 | A | 9/2008 |
| JP | 2009033354 | * | 2/2009 |
| JP | 2009033354 | A | 2/2009 |
| JP | 2009-253641 | A | 10/2009 |
| JP | 2009237767 | A | 10/2009 |
| JP | 2010199642 | A | 9/2010 |
| JP | 2011118936 | A | 6/2011 |
| WO | WO 2007/007397 | A1 | 1/2007 |

OTHER PUBLICATIONS

Office Action issued May 3, 2016, by the State Intellectual Property of China in corresponding Chinese Patent Application No. 201310412267.7 with an English translation (17 pages).

* cited by examiner

WN1

MOBILE INFORMATION TERMINAL HAS REPLACEMENT PORTION PERFORMING REPLACEMENT PROCESSING FOR MOVING TEMPORARY SETTING DATA TO STORAGE DEVICE

This application is based on Japanese patent application No. 2012-202295 filed on Sep. 14, 2012, the contents of which are hereby incorporated by reference.

BACKGROUND OF THE INVENTION

1. Field of the Invention

The present invention relates to a technology for using a tablet type computer or the like in a manner to suit different environments for users.

2. Description of the Related Art

Recent years have seen the widespread use of tablet type computers (hereinafter, each of which is referred to as a "tablet computer"). The hardware of a tablet computer is often common to that of a smartphone. Accordingly, in many cases, an operating system of a smartphone is used also in a tablet computer. For example, Android developed by Google Inc. and iOS developed by Apple Inc. are used in both smartphones and tablet computers.

A tablet computer has a casing larger than that of a smartphone, and is sometimes shared by users at work and at home.

In the existing operating system, however, it is impossible to prepare, for each user, setting-related data, namely, a user profile, and to use the same selectively on a user-by-user basis.

When users share a tablet computer, it is desirable that user profiles be prepared for the individual users and be used selectively on a user-by-user basis.

Several methods have been proposed through which an environment of a mobile device such as a mobile phone terminal is set for each user (Japanese unexamined patent application publication Nos. 2009-253641 and 2006-324950). As for a tablet computer configured to install thereonto a personal computer operating system, it is possible to prepare user profiles for users and use the same selectively after such an operating system is installed on the tablet computer.

In general, users of tablet computers want to use operating systems preinstalled on their tablet computers. This is because such operating systems provide advanced functionality and have many available applications.

According to conventional technologies, an operating system has to be created from the beginning.

Even when an application compatible with a personal computer can be used, an application suitable for a tablet computer cannot be used.

SUMMARY

The present invention has been achieved in light of such an issue, and an object thereof is to enable users to use one computer in a manner to suit the needs or preferences of the individual users even if an existing operating system is used in the computer.

According to one aspect of the present invention, a mobile information terminal includes a normal setting data storage portion configured to store temporary setting data in advance as normal setting data that is related to settings; a separate setting data storage portion configured to store, for each user, separate setting data that is related to individual settings in association with an identifier of each user; a control portion configured to perform specific processing based on the normal setting data stored in the normal setting data storage portion; a receiving portion configured to receive the identifier; and a replacement portion configured to perform replacement processing for moving the temporary setting data to a save storage portion and storing into the normal setting data storage portion, as the normal setting data, the separate setting data stored in association with the identifier received by the receiving portion.

These and other characteristics and objects of the present invention will become more apparent by the following descriptions of preferred embodiments with reference to drawings.

DESCRIPTION OF THE PREFERRED EMBODIMENTS

Figure 1:
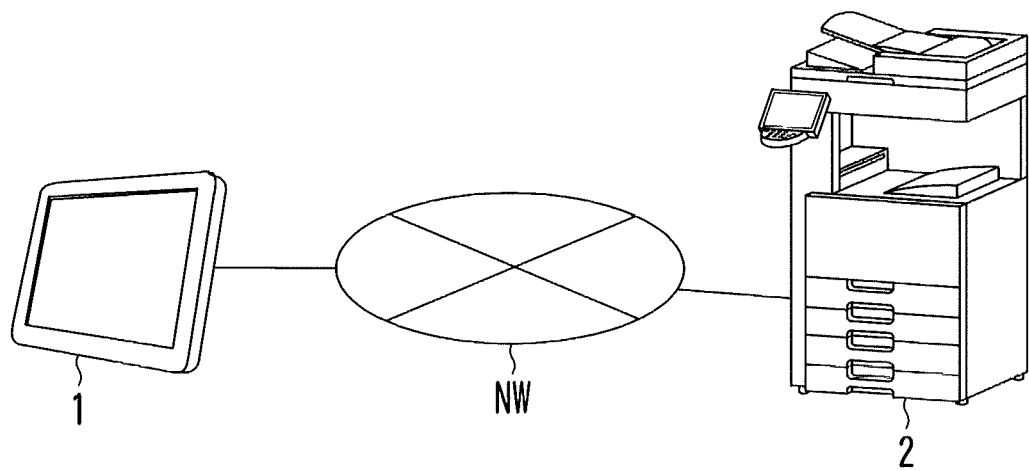
FIG. 1 is a diagram showing an example of the overall configuration of an intranet.
Figure 2:
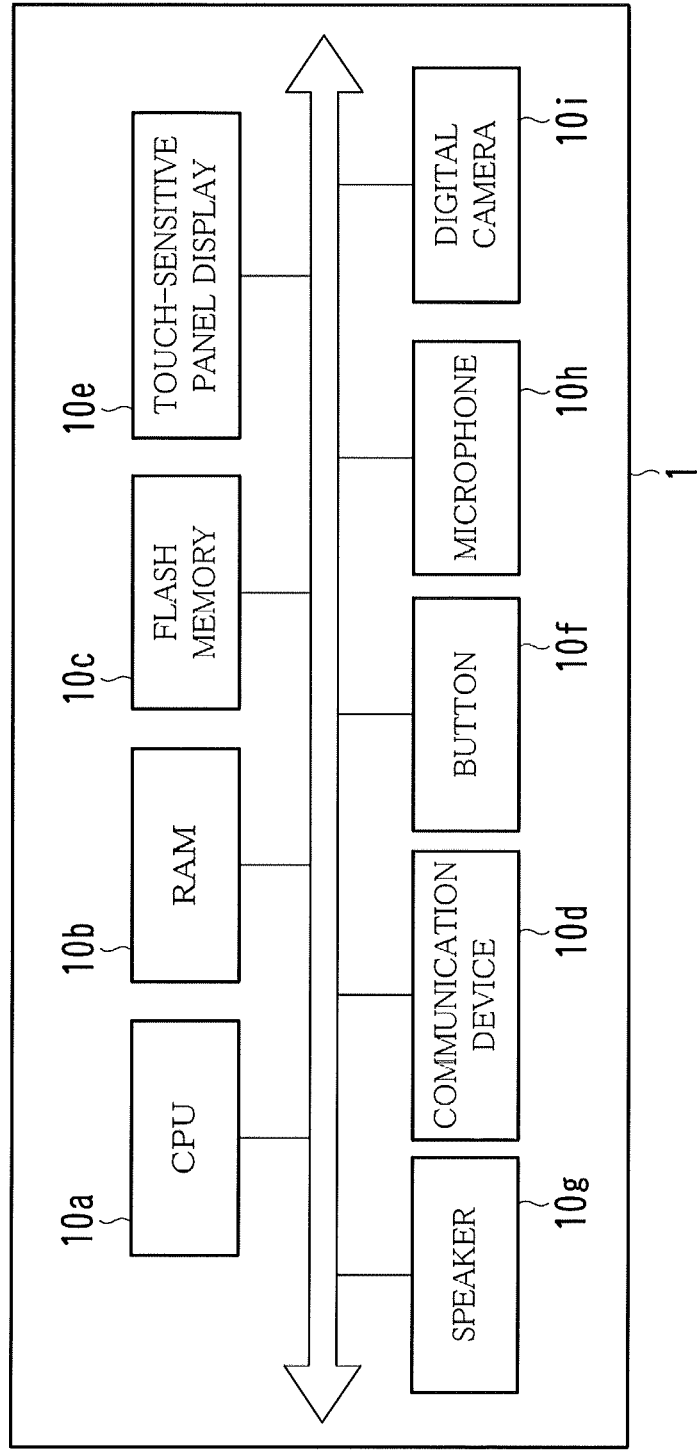
FIG. 2 is a diagram showing an example of the hardware configuration of a tablet computer.
Figure 3:
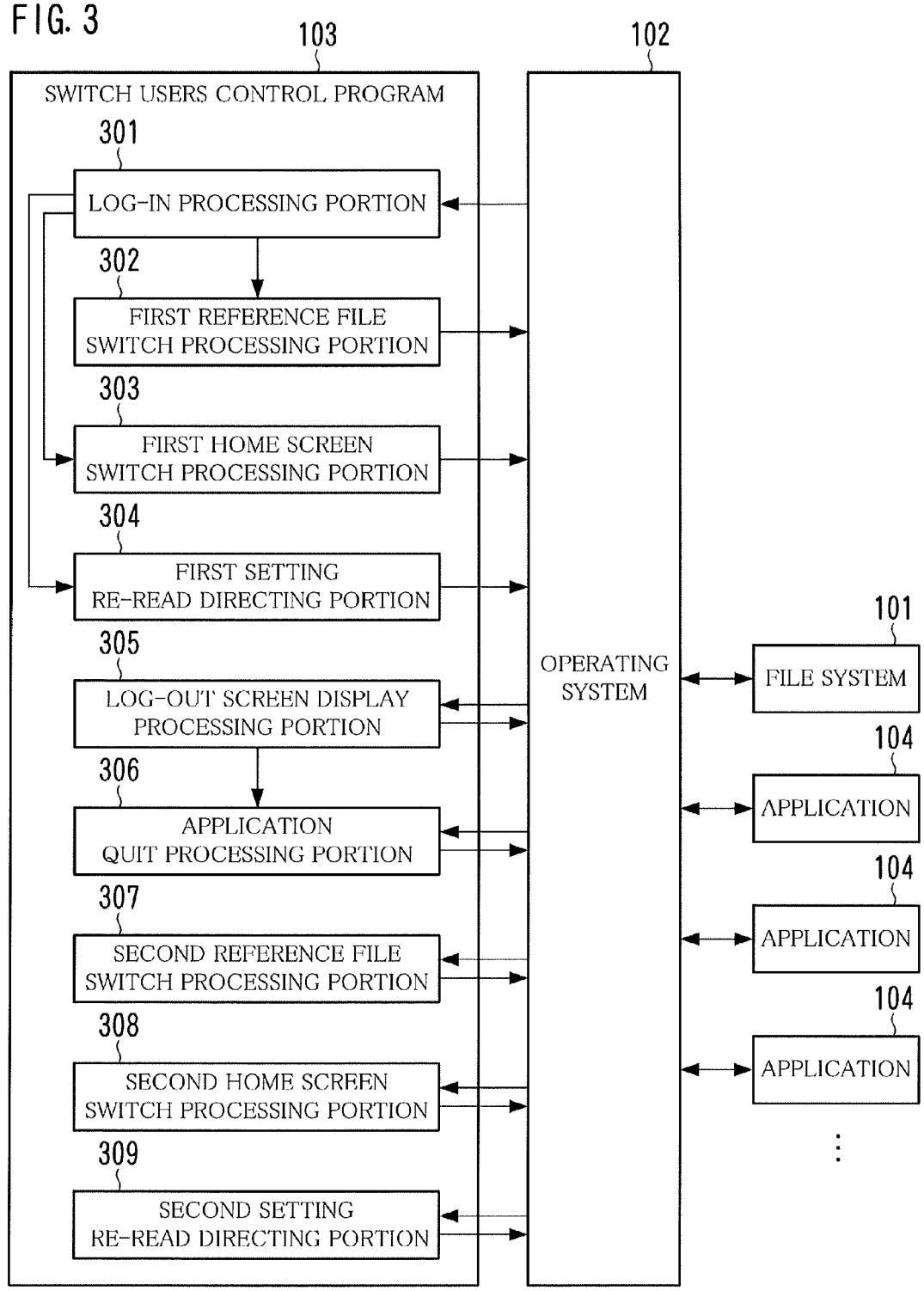
FIG. 3 is a diagram showing an example of the functional configuration of a tablet computer.
Figure 4:
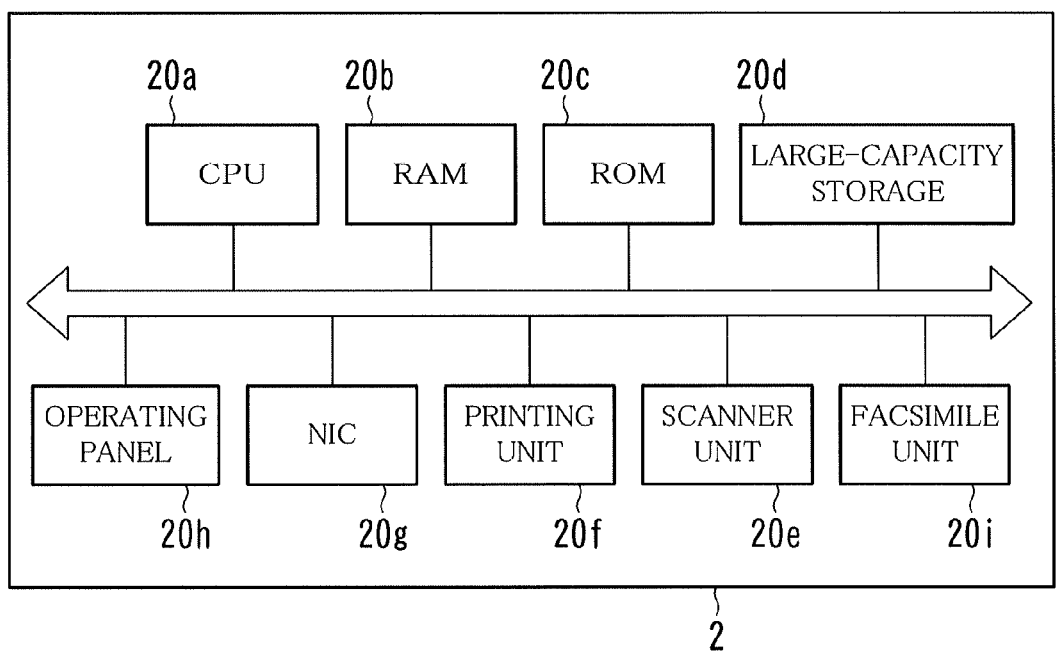
FIG. 4 is a diagram showing an example of the hardware configuration of an image forming apparatus.

FIG. 1 is a diagram showing an example of the overall configuration of an intranet 4; FIG. 2 is a diagram showing an example of the hardware configuration of a tablet computer 1; FIG. 3 is a diagram showing an example of the functional configuration of the tablet computer 1; and FIG. 4 is a diagram showing an example of the hardware configuration of an image forming apparatus 2.

Referring to FIG. 1, the intranet 4 is configured of the tablet computer 1, the image forming apparatus 2, a communication line NW, and so on.

The communication line NW is configured of a hub, a router, a cable, a wireless base station, and so on. The tablet computer 1 and the image forming apparatus 2 perform communication with each other via the communication line NW.

The tablet computer 1 is a thin-plate computer. The tablet computer 1 is generally called a "tablet PC" or "tablet terminal", for example.

Referring to FIG. 2, the tablet computer 1 is configured of a Central Processing Unit (CPU) 10a, a Random Access Memory (RAM) 10b, a flash memory 10c, a communication device 10d, a touch-sensitive panel display 10e, a button 10f, a speaker 10g, a microphone 10h, a digital camera 10i, and so on.

The communication device 10d is to transmit data to the image forming apparatus 2 and vice versa through the communication line NW in accordance with a protocol such as Transmission Control Protocol/Internet Protocol (TCP/IP). The communication device 10d is, for example, a device serving as a slave unit of a wireless Local Area Network (LAN). In some cases, a device for performing communication through a mobile phone network such as a 3G line is further provided, as the communication device 10d, in the tablet computer 1.

The touch-sensitive panel display 10e displays, for example, a screen for presenting messages or instructions to a user, a screen for allowing a user to input desired processing types and processing conditions, and a screen showing the results of processing performed by the CPU 10a. A user operates the button 10f or the touch-sensitive panel display 10e while viewing the screens, which allows the user to input information and commands to the tablet computer 1.

The button 10f is used to turn the power ON/OFF, to switch between ON and OFF of a sleep mode, and to change a home screen. A plurality of buttons 10f is provided for roles in some cases.

The speaker 10g serves to output sounds. The microphone 10h collects sounds and converts the collected sounds into digital form. The digital camera 10i photographs an image to generate image data.

Referring to FIG. 3, the flash memory 10c stores, therein, a file system 101, an operating system 102, a switch users control program 103, applications 104, and so on.

The file system 101 is a controller for the flash memory 10c. The file system 101 writes a file into the flash memory 10c, reads out a file from the flash memory 10c, and deletes a file from the flash memory 10c. The processing is executed basically based on a request made by the operating system 102. Alternatively, the processing is executed based on a request made by a program for starting the operating system 102.

For example, when being requested to write a file onto a specific directory of the flash memory 10c, the file system 101 writes the file into an available region of the flash memory 10c. The file system 101 then stores, into a table, data indicating the correlation between a path to the file and an address of the region. Note that the available region is a region whose address has not yet been associated with any files in the table.

When being requested to read out a file, the file system 101 reads out the file from the flash memory 10c based on the table.

When being requested to delete a file, the file system 101 deletes, from the table, data indicating the correlation between the file and the address of the region. This deallocates the region where the file was stored. Further, the file may be deleted completely by overwriting a predetermined bit string (for example, bit string consisting of "zero" only) with the region.

When needing to read, write, and delete a file to/from the flash memory 10c, the switch users control program 103 and the application 104 make a request to the file system 101 through an Application Program Interface (API) of the operating system 102, and so on.

The operating system 102 performs system management of the tablet computer 1, and provides a basic Graphical User Interface (GUI). In particular, the operating system 102 provides a home screen as the basic GUI.

In order to provide a variety of functions to the applications, the API and a system call are prepared in the operating system 102.

However, the operating system 102 according to this embodiment is not configured to provide, for each user, environment-related set values such as a desktop design, a language and font size used in the user interface, a standard time, and an output level of sounds. In short, the operating system 102 according to this embodiment is not a multiuser system.

The operating system 102 is, for example, Android developed by Google Inc., Windows Phone (Windows is the registered trademark) developed by Microsoft Corporation, iOS developed by Apple Inc., and BlackBerry OS developed by Research In Motion Limited.

The switch users control program 103 is software to enable each user to use the tablet computer 1 in a use environment according to his/her preferences. In other words, the switch users control program 103 is software to selectively use user profiles in the tablet computer 1 for the individual users.

The switch users control program 103 implements the functions of a log-in processing portion 301, a first reference file switch processing portion 302, a first home screen switch processing portion 303, a first setting re-read directing portion 304, a log-out screen display processing portion 305, an application quit processing portion 306, a second reference file switch processing portion 307, a second home screen switch processing portion 308, a second setting re-read directing portion 309, and so on. The functions of these portions are described later.

The flash memory 10c stores, therein, the applications 104 such as a mailer, a web browser, a scheduling application, and a multimedia player application.

The modules forming each of the file system 101, the operating system 102, and the applications 104, and the switch users control program 103 are loaded into the RAM 10b as necessary, and are executed by the CPU 10a. The entire or a part of the functions of the file system 101 is sometimes implemented by circuits such as a Field Programmable Gate Array (FPGA) or an Application Specific Integrated Circuit (ASIC).

The image forming apparatus 2 is an apparatus that is generally called a "Multi-Functional Peripheral (MFP)" or a "multifunction device". The image forming apparatus 2 is an apparatus into which various functions such as copying, PC printing, faxing, and scanning are consolidated.

The PC printing function is a function to print an image onto paper based on image data received from a terminal such as the tablet computer 1 or a personal computer. The PC printing function is sometimes called a "network printer function" or "network printing function".

Referring to FIG. 4, the image forming apparatus 2 (see FIG. 1) is configured of a CPU 20*a*, a RAM 20*b*, a Read Only Memory (ROM) 20*c*, a large-capacity storage 20*d*, a scanner unit 20*e*, a printing unit 20*f*, a Network Interface Card (NIC) 20*g*, an operating panel 20*h*, a facsimile unit 20*i*, a variety of types of control circuits, and so on.

The NIC 20*g* performs communication with the tablet computer 1 and a personal computer via the communication line NW in accordance with a protocol such as TCP/IP.

The operating panel 20*h* is configured of a key entry portion, a touch-sensitive panel display, and so on. The key entry portion is a so-called hardware keyboard, and includes a numeric keypad, a start key, a stop key, and a function key. The touch-sensitive panel display serves to display a variety of screens thereon. A user operates the key entry portion or the touch-sensitive panel display while viewing the screens, which allows the user to enter information and commands to the image forming apparatus 2.

The scanner unit 20*e* serves to read an image recorded on a sheet of paper placed on a document glass, and to generate image data thereof.

The facsimile unit 20*i* serves to send and receive image data with a facsimile terminal via a public telephone line in accordance with a protocol such as G3.

The printing unit 20*f* serves to print, onto paper, an image read by the scanner unit 20*e* and an image indicated in image data sent by the tablet computer 1, a personal computer, or a fax terminal.

The ROM 20*c* or the large-capacity storage 20*d* stores, therein, software for implementing the foregoing functions, e.g., an operating system, middleware, and application. Modules of such software are loaded into the RAM 20*b* as necessary, and are executed by the CPU 20*a*.

Examples of the large-capacity storage 20*d* are a hard disk drive and a Solid State Drive (SSD).

The following is a description as to how to adapt the tablet computer 1 to a multiple of users. The description is broadly divided into the following two parts: preparation for file and directory; and processing while the tablet computer 1 is used.

[Preparation for File and Directory]

Figure 5:
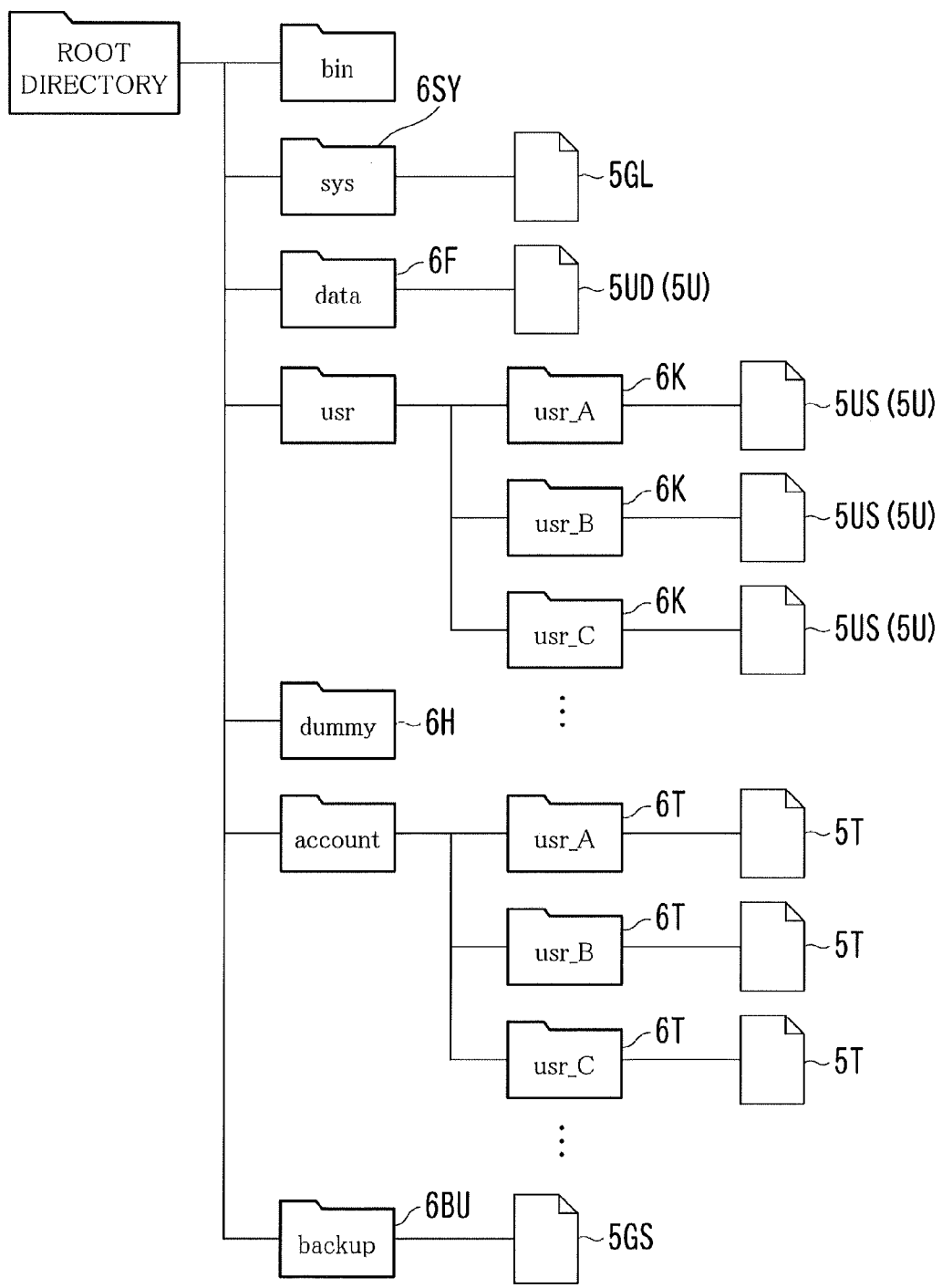
FIG. 5 is a diagram showing an example of the structure of directories of a flash memory.
Figure 6:
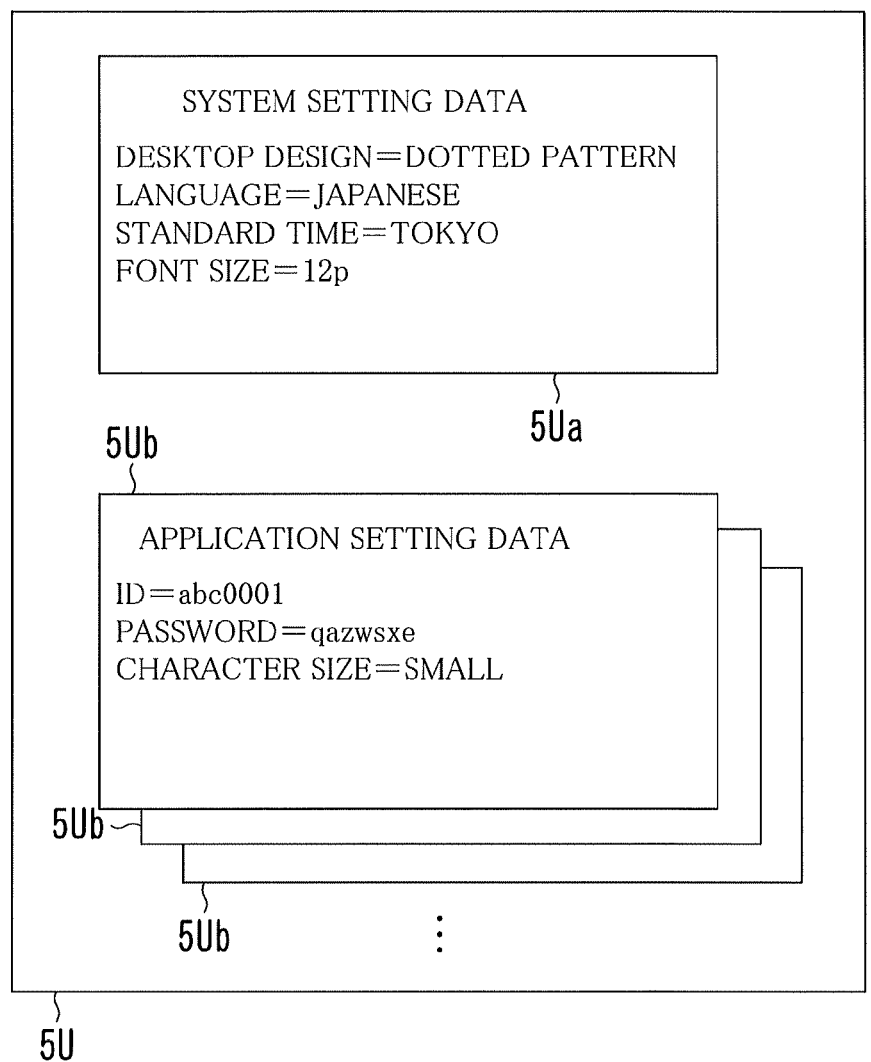
FIG. 6 is a diagram showing an example of a user file.
Figure 7:
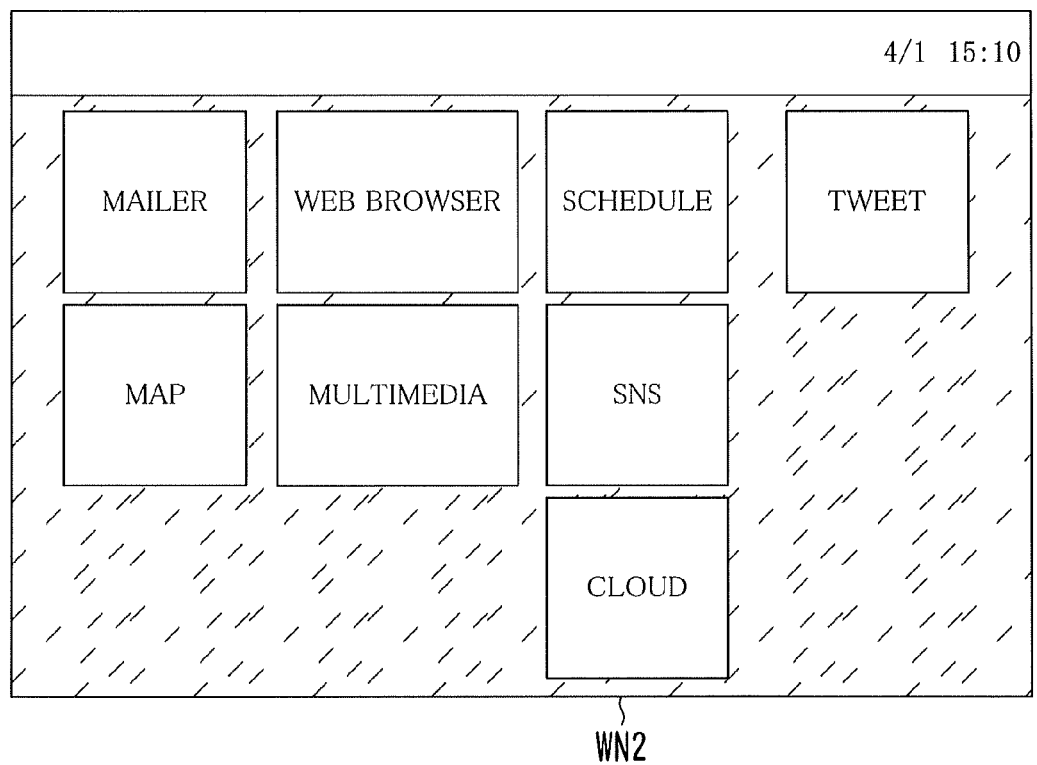
FIG. 7 is a diagram showing an example of a normal home screen.
Figure 8:
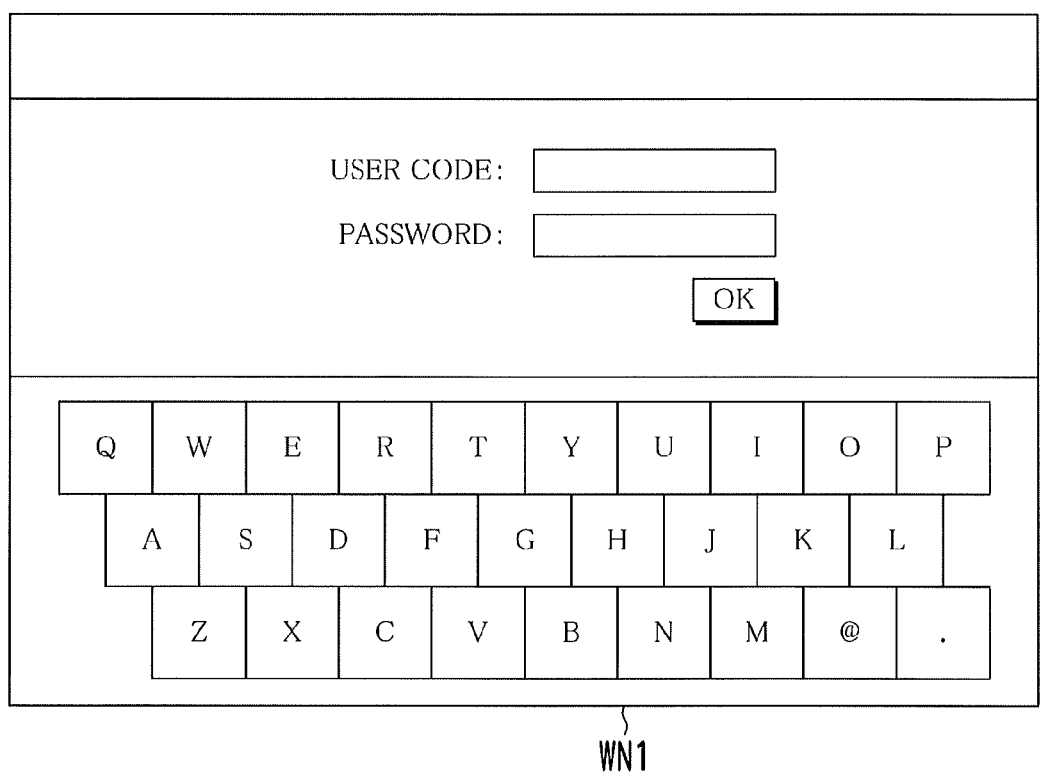
FIG. 8 is a diagram showing an example of a log-in screen.

FIG. 5 is a diagram showing an example of the structure of directories of the flash memory 10*c*; FIG. 6 is a diagram showing an example of a user file 5U; FIG. 7 is a diagram showing an example of a normal home screen WN2; and FIG. 8 is a diagram showing an example of a log-in screen WN1.

The tablet computer 1 is shared by a plurality of users. For this reason, the flash memory 10*c* stores, in advance, the following files and directories as shown in FIG. 5.

Each user is given one account file 5T. The account file 5T contains data indicating a user code for identifying the user concerned and a password used to verify the identity of the user concerned.

The account file 5T is stored in a predetermined region prepared for the user who is an owner of the account file 5T. In this embodiment, a directory is used as a region where the account file 5T and files described below are stored. Hereinafter, a region where the account file 5T for a user is stored is referred to as an "account directory 6T". For example, the account file 5T of a user_A is stored in an account directory 6T specified by a path "/account/usr_A" of the flash memory 10*c*.

Each user is also given one user file 5U. As shown in FIG. 6, the user file 5U contains system setting data 5Ua and application setting data 5Ub.

The system setting data 5Ua indicates environment-related set values of the operating system 102, e.g., a desktop design, a language, a font size, and a standard time.

The application setting data 5Ub is prepared for each of the applications 104. The application setting data 5Ub indicates set values for each of the applications 104.

The user file 5U is thus a file including a user profile.

The user files 5U are given the identical predetermined file name. Each of the user files 5U is stored in a directory prepared for the user who is an owner of the user file 5U concerned. Hereinafter, a directory where the user file 5U for a user is stored is referred to as a "user-specific set value directory 6K". For example, the user file 5U of the user_A is stored in a user-specific set value directory 6K specified by a path "/usr/usr_A" of the flash memory 10*c*.

Further, the flash memory 10*c* is provided with a directory specified by a path "/dummy". The directory is to save a basic user file 5U used for a case where the switch users control program 103 is not applied. The directory is hereinafter referred to as a "save directory 6H". For a case where the switch users control program 103 is applied, the basic user file 5U is not used after a user has logged in the tablet computer 1. Thus, the basic user file 5U is a temporary dummy file. The basic user file 5U is hereinafter referred to as a "dummy user file 5UD". In contrast, a user file 5U of each user is hereinafter referred to as a "true user file 5US".

For the case where the switch users control program 103 is not applied, the dummy user file 5UD is stored in a directory which is preset as a region where setting data in the operating system 102 is stored. In this embodiment, the dummy user file 5UD is stored in a default data directory 6F specified by a path "/data". The dummy user file 5UD is used as an ordinary user file 5U.

In general, the normal home screen WN2 as that shown in FIG. 7 is usually prepared as a normal home screen in the operating system 102. The normal home screen WN2 has a layout of icons through which the applications 104 are selected. To be specific, in general, a normal screen file 5GS to display the normal home screen WN2 is stored in a predetermined directory, e.g., in a system directory 6SY specified by a path "/sys". The normal home screen WN2 is usually displayed as a home screen.

However, in this embodiment, the normal screen file 5GS is backed up in advance in another directory, e.g., in a backup directory 6BU specified by a path "/backup". Instead of the normal screen file 5GS, a log-in screen file 5GL to display the log-in screen WN1 shown in FIG. 8 through which the user logs into the tablet computer 1 is stored in the system directory 6SY.

It is preferable that, before the tablet computer 1 goes on sale, an operator of a manufacturer of the tablet computer 1 uses a tool such as Software Development Kit (SDK) to prepare the account file 5T, the true user file 5US, the log-in screen file 5GL, the account directory 6T, the user-specific set value directory 6K, the save directory 6H, and the backup directory 6BU based on customer's desires. The operator of the manufacturer also backs up the normal screen file 5GS to the backup directory 6BU in advance.

[Processing while the Tablet Computer 1 is Used]

Figure 9:
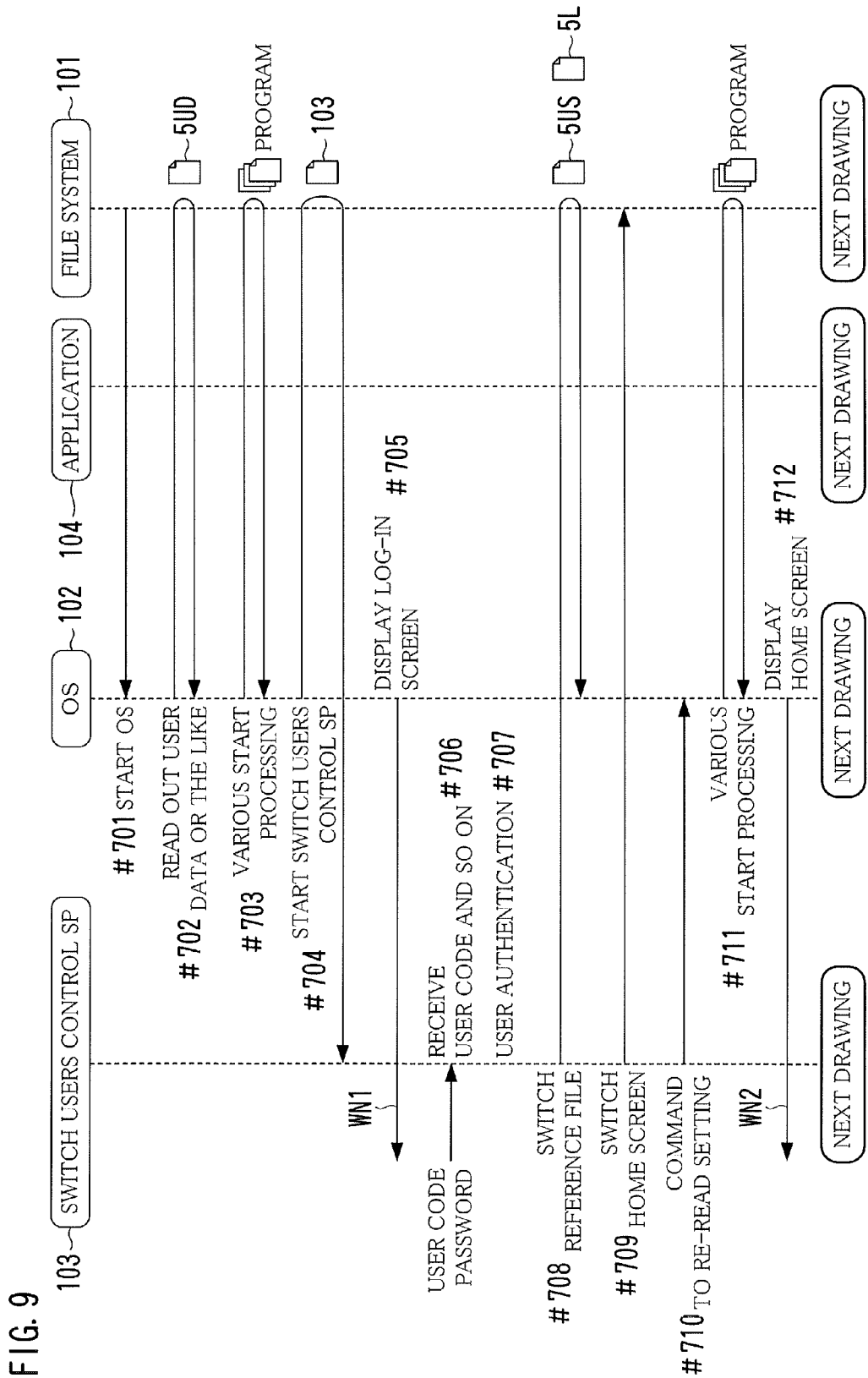
FIG. 9 is a sequence diagram showing an example of the flow of processing performed by a file system, an operating system, and a switch users control program.
Figure 10:
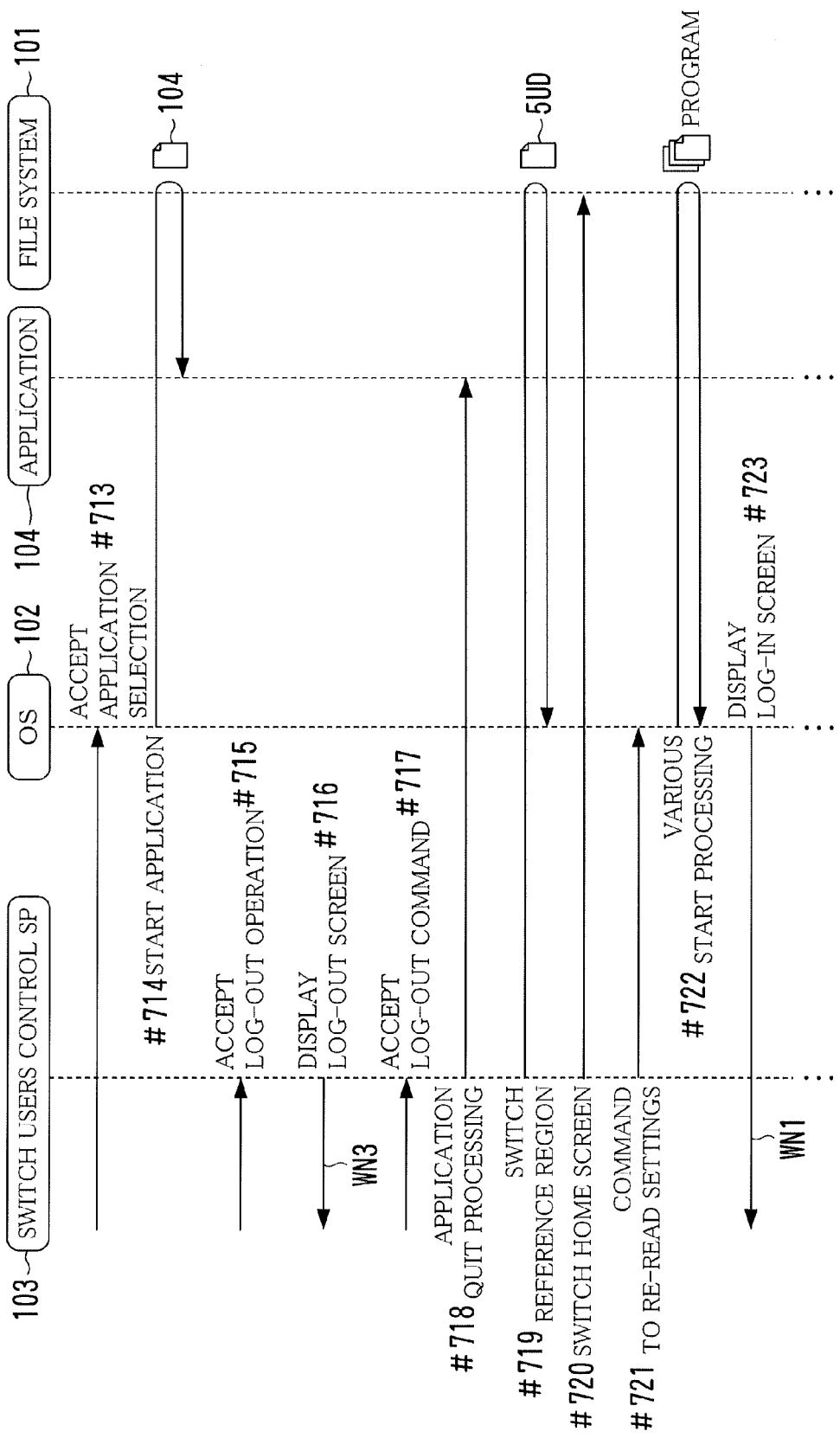
FIG. 10 is a sequence diagram showing an example of the flow of processing performed by a file system, an operating system, and a switch users control program.
Figure 11A:
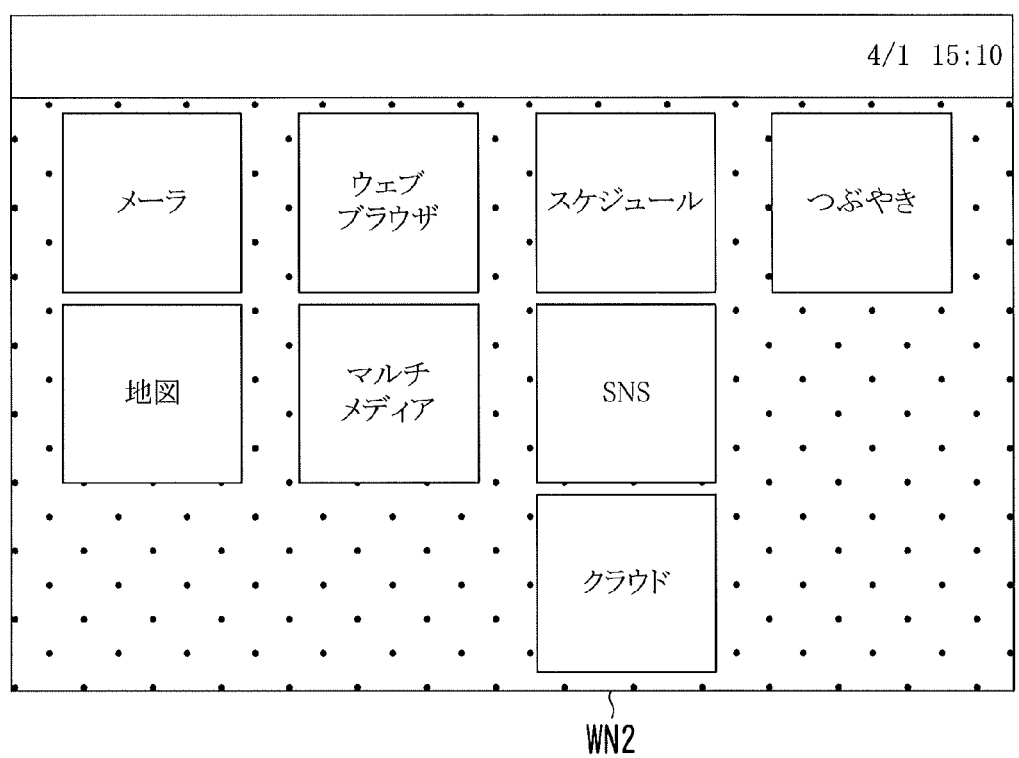
FIGS. 11A and 11B are diagrams showing an example in which system setting data is applied to a normal home screen.
Figure 11B:
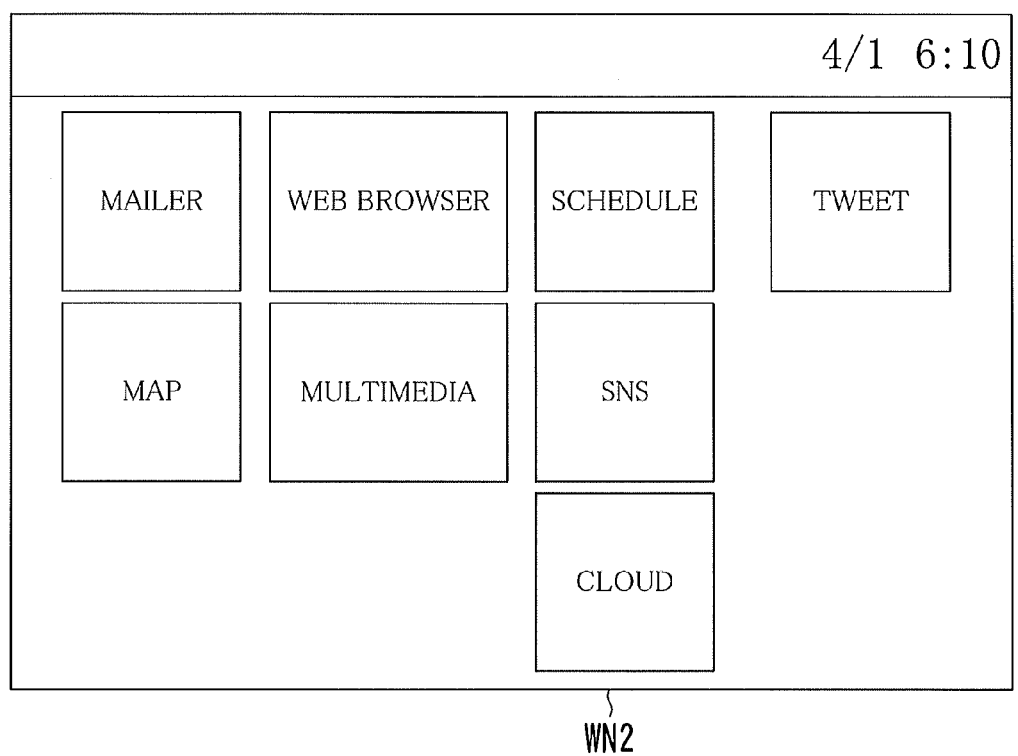
Figure 12:
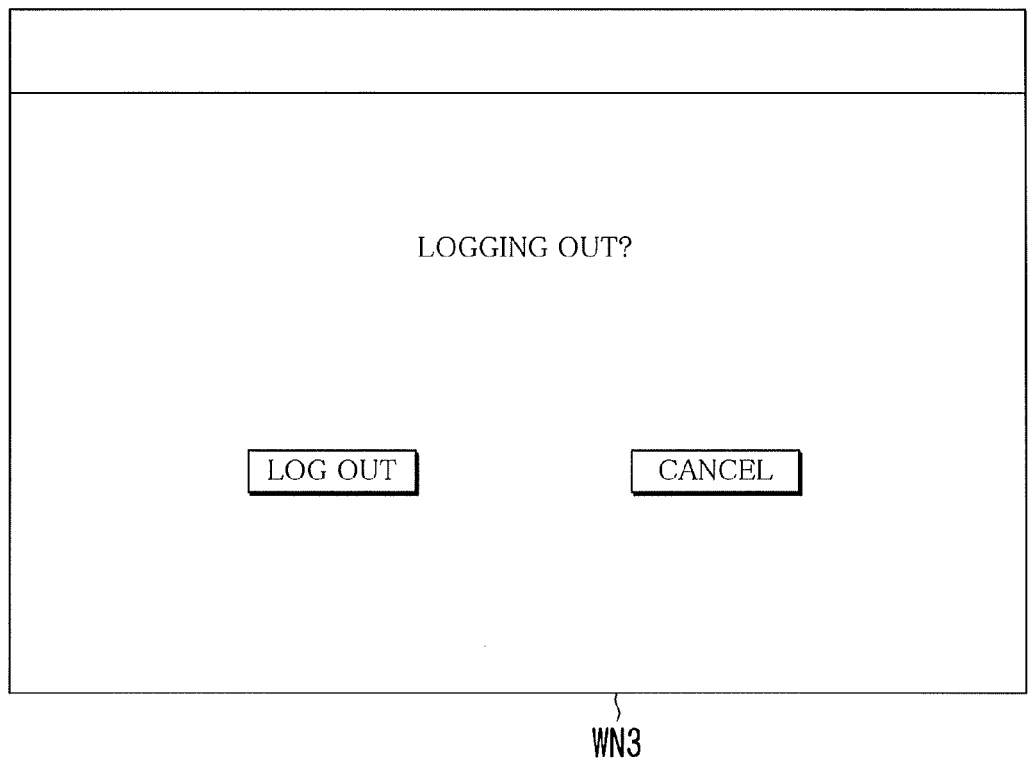
FIG. 12 is a diagram showing an example of a log-out screen.

FIGS. 9 and 10 are sequence diagrams showing an example of the flow of processing performed by the file system 101, the operating system 102, and the switch users control program 103; FIGS. 11A and 11B are diagrams showing an example in which the system setting data 5Ua is applied to the normal home screen WN2; and FIG. 12 is a diagram showing an example of a log-out screen WN3.

When being turned ON, the tablet computer 1 performs processing according to the procedure shown in the sequence diagrams of FIGS. 9 and 10.

The tablet computer 1 starts the operating system 102 based on a boot program stored in a predetermined region (Step #701 of FIG. 9). The predetermined region is usually a Master Boot Record (MBR). The boot program enables the tablet computer 1 to load a variety of data and programs constituting the operating system 102 into the RAM 10b (Step #702 and Step #703).

The procedure from Step #701 through Step #703 is similar to the procedure to start a conventional operating system.

In Step #702, in particular, the user file 5U stored in the default data directory 6F, namely, the dummy user file 5UD is loaded.

In Step #703, a variety of service programs such as a clock program, a communication program, an available battery monitoring program is started. Some of the programs refer to the system setting data 5Ua of the user file 5U, and others do not. For example, the clock program calculates a date/time to be displayed based on the standard time. A program which does not involve referring to the system setting data 5Ua is sometimes launched in advance of the loading of the dummy user file 5UD.

When the variety of data and programs are loaded completely, the tablet computer 1 loads the switch users control program 103 (Step #704). Thereafter, the switch users control program 103 stays resident in the RAM 10b.

The tablet computer 1 then displays the home screen on the touch-sensitive panel display 10e based on image data stored in the system directory 6SY (Step #705). Here, the tablet computer 1 displays the log-in screen WN1 (see FIG. 8) since the log-in screen file 5GL is stored.

When the log-in screen WN1 is displayed, the user enters his/her user code and password, and presses an "OK" button. In response to this operation, the tablet computer 1 accepts the user code and password thus entered (Step #706). Note that, in principle, the tablet computer 1 prohibits operation other than that in the log-in screen WN1. In particular, the tablet computer 1 prohibits operation to start the application 104. Operation to turn the light of the touch-sensitive panel display 10e OFF and operation to turn the power OFF are allowed in the tablet computer 1.

The processing from Step #701 through Step #703 and the processing of Step #705 are the same as the processing for starting a conventional operating system. However, the processing of Step #704 cannot be performed only by the conventional operating system. In view of this, the processing of Step #704 is preferably performed in the following manner.

For example, a command to start the switch users control program 103 may be written in advance onto the boot program. The tablet computer 1 is capable of starting the switch users control program 103 based on the command.

Alternatively, the switch users control program 103 may be designated as a program to be executed for a case where a predetermined event occurs in the log-in screen WN1. The program to be executed is a program corresponding to activity used in Android. For example, the switch users control program 103 may be designated as a program to be executed for the case where the "OK" button is pressed. In such a case, the processing of Step #705 is executed in advance of the processing of Step #704.

Loading the switch users control program 103 enables the functions of the log-in processing portion 301 through the second home screen switch processing portion 308 shown in FIG. 3 to be implemented. The functions are described in order below.

The log-in processing portion 301 matches the user code and password entered by the user with a user code and password indicated in each of the account files 5T stored in the account directory 6T, and then, performs user authentication (Step #707). If the account file 5T is found which indicates the same user code and password as those entered by the user, then the log-in processing portion 301 permits the user to log into the tablet computer 1. Hereinafter, the user who has logged into the tablet computer 1 is referred to as a "logged-in user".

The first reference file switch processing portion 302 performs processing for changing environment-related data to be referred to (Step #708).

The first reference file switch processing portion 302 moves the dummy user file 5UD from the default data directory 6F to the save directory 6H to save the dummy user file 5UD. The first reference file switch processing portion 302 then reads out a true user file 5US of the logged-in user from the user-specific set value directory 6K of the logged-in user, and copies the true user file 5US to the default data directory 6F. For example, when the logged-in user is the user_A, the first reference file switch processing portion 302 copies a true user file 5US of the user_A to the default data directory 6F.

Instead of the true user file 5US, a symbolic link 5L thereof may be stored in the default data directory 6F. To be specific, the first reference file switch processing portion 302 generates, as the symbolic link 5L, a symbolic link of the true user file 5US stored in the user-specific set value directory 6K of the logged-in user. The symbolic link 5L is then stored in the default data directory 6F.

The first home screen switch processing portion 303 moves the log-in screen file 5GL from the system directory 6SY to the backup directory 6BU, and also moves the normal screen file 5GS from the backup directory 6BU to the system directory 6SY (Step #709). In short, the log-in screen file 5GL and the normal screen file 5GS are replaced with each other.

The first setting re-read directing portion 304 restarts the entire or a part of the programs of the operating system 102 that is started in Step #702 (Step #710 and Step #711). Although it is not necessary that all of the programs be restarted, it is desirable to restart a program which involves referring to the user file 5U. The default data directory 6F stores therein the true user file 5US of the logged-in user. Accordingly, when such a program is restarted, the set values indicated in the system setting data 5Ua of the true user file 5US (see FIG. 5) are reflected, so that the use environment such as a language, a font size, and a standard time can be tailored to the need or preference of the logged-in user.

When the symbolic link 5L rather than the true user file 5US is stored in the default data directory 6F, the true user file 5US is referred to from the user-specific set value directory 6K of the logged-in user based on the symbolic link 5L, so that the set values are reflected.

For restart of only a part of the programs, it is preferable to preset the program to be restarted in the first setting re-read directing portion 304. Alternatively, all of the programs to be executed after loading the user file 5U may be restarted. Note that, in such a case, settings should be so made that starting the switch users control program 103 is skipped.

Along with the restart processing in Step #710 and Step #711, the operating system 102 displays a home screen in the touch-sensitive panel display 10*e* based on screen data described in the system directory 6SY (Step #712). Unlike the case of Step #705, since the log-in screen file 5GL is stored, the normal home screen WN2 (see FIG. 7) rather than the log-in screen WN1 (see FIG. 8) is displayed. At this time, the system setting data 5Ua in the true user file 5US of the logged-in user is referred to. The tablet computer 1 therefore displays the normal home screen WN2 in which a desktop design and so on have been customized to suit the logged-in user.

For example, when the system setting data 5Ua indicates, as the set values for a desktop design, a language, a font size, and a standard time, "dotted pattern", "Japanese", "8 point", and "Tokyo", respectively, the normal home screen WN2 as shown in FIG. 11A is displayed. Alternatively, when the system setting data 5Ua indicates, as the individual set values, "solid", "English", "12 point", and "London", respectively, the normal home screen WN2 as shown in FIG. 11B is displayed.

Thereafter, the logged-in user starts any of the applications 104 appropriately for different works. When the logged-in user performs operation to start an application, e.g., presses an icon, the operating system 102 starts the application 104 corresponding to the icon pressed as per the conventional art (Step #713 and Step #714 of FIG. 10).

The applications 104 are executed based on the application setting data 5Ub (see FIG. 5) of the true user file 5US stored in the default data directory 6F. The processing is eventually performed in accordance with the set values of each logged-in user.

For example, when the application 104 started is a web browser, the tablet computer 1 displays, first, a web page having a URL of a home page (start page) indicated in the application setting data 5Ub.

In the case where the symbolic link 5L rather than the true user file 5US is stored in the default data directory 6F, the true user file 5US stored in the user-specific set value directory 6K of the logged-in user is referred to based on the symbolic link 5L.

In order for the logged-in user to finish the operation on the tablet computer 1, he/she performs predetermined operation.

In response to the operation, the log-out screen display processing portion 305 of the switch users control program 103 displays the log-out screen WN3 as shown in FIG. 12 on the touch-sensitive panel display 10*e* (Step #715 and Step #716).

When the logged-in user presses a "log-out" button (Step #717), the application quit processing portion 306, the second reference file switch processing portion 307, the second home screen switch processing portion 308, and the second setting re-read directing portion 309 perform log-out processing in the following manner (Step #718 through Step #722).

The application quit processing portion 306 finishes the application 104 currently loaded in the flash memory 10*c* (Step #718).

The second reference file switch processing portion 307 deletes the true user file 5US from the default data directory 6F. In a case where the symbolic link 5L rather than the true user file 5US is stored, the symbolic link 5L is deleted from the default data directory 6F. The second reference file switch processing portion 307 then moves the dummy user file 5UD saved in the save directory 6H to the default data directory 6F (Step #719).

The second home screen switch processing portion 308 moves the normal screen file 5GS from the system directory 6SY to the backup directory 6BU, and also moves the log-in screen file 5GL from the backup directory 6BU to the system directory 6SY (Step #720). In short, the normal screen file 5GS and the log-in screen file 5GL are replaced with each other.

As with the processing in Step #710 and Step #711, the second setting re-read directing portion 309 restarts the entire or a part of the programs of the operating system 102 that is started in Step #702 (Step #721 and Step #722).

In association with the restart, the tablet computer 1 displays, as the home screen, the log-in screen WN1 as with the processing in Step #705 (Step #723).

Thereafter, when a user enters his/her user code and password, the processing flow goes back to Step #706 and the tablet computer 1 performs the foregoing processing.

After that, when the user_B logs into the tablet computer 1 for example, a true user file 5US of the user_B is loaded into the default data directory 6F. Thereby, a use environment specifically for the user_B is implemented.

Figure 13:
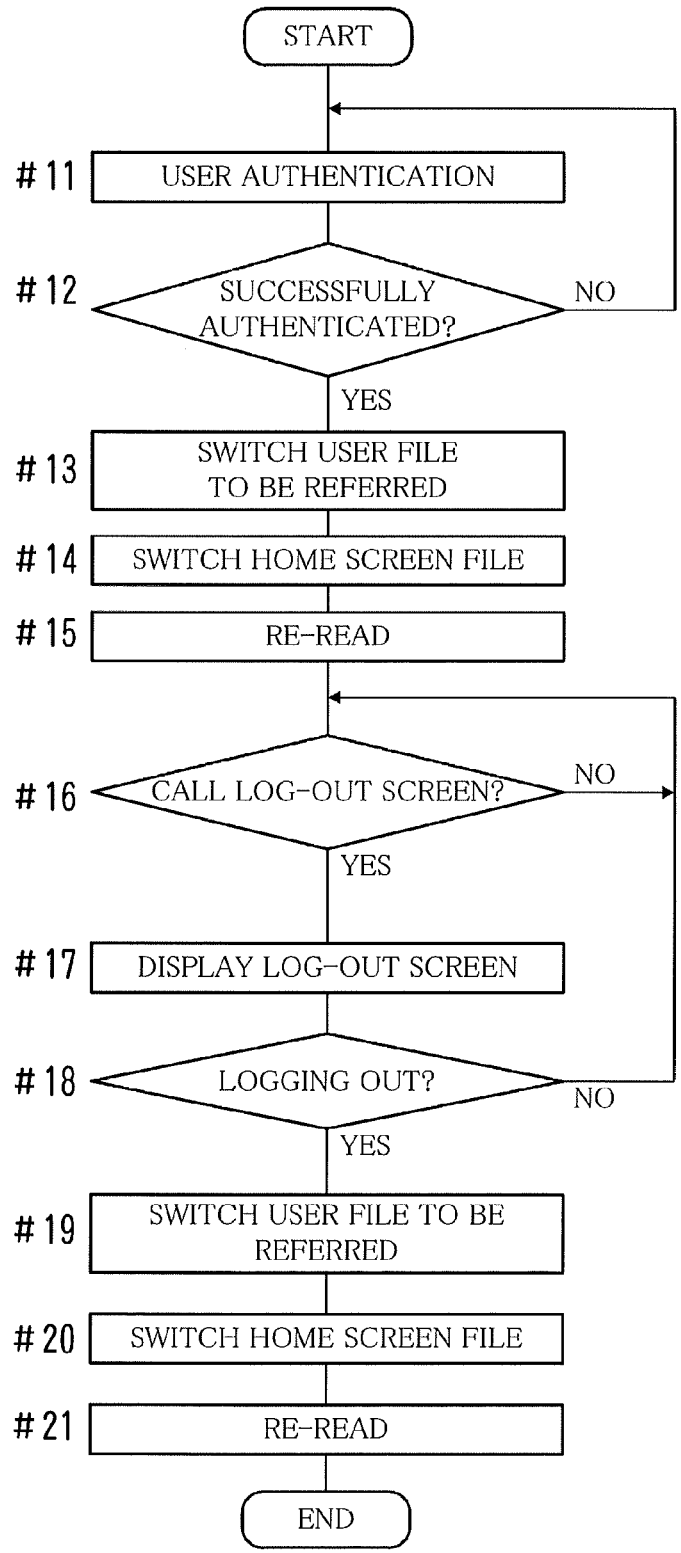
FIG. 13 is a flowchart depicting an example of the flow of processing performed based on a switch users control program.

FIG. 13 is a flowchart depicting an example of the flow of processing performed based on the switch users control program 103.

The description goes on to, with reference to the flowchart of FIG. 13, the outline of processing performed by the tablet computer 1 for a case where the switch users control program 103 is executed.

When a user enters a user code and password on the log-in screen WN1 (see FIG. 10), the tablet computer 1 performs user authentication (Step #11 of FIG. 13). When the user is successfully authenticated (Yes in Step #12), the tablet computer 1 allows the user to log thereinto.

The tablet computer 1 then moves the dummy user file 5UD from the default data directory 6F to the save directory 6H, and copies a true user file 5US of the user (logged-in user) to the default data directory 6F (Step #13). In this way, user data to be referred to by the operating system 102 and the applications 104 is changed from the dummy user file 5UD to the true user file 5US of the logged-in user.

In parallel with the processing of Step #13 or before or after the same, the tablet computer 1 replaces the log-in screen file 5GL and the normal screen file 5GS with each other (Step #14). Thereby, preparation for changing the home screen is finished.

The tablet computer 1 restarts the entire or a part of the programs of the operating system 102 (Step #15). This implements the environment in accordance with the content of the true user file 5US of the logged-in user. For example, the normal home screen WN2 (see FIG. 7) is displayed in which a desktop design and so on according to the preference of the logged-in user are applied. The logged-in user is then capable of starting any of the applications 104 and working by using the same. In such a case also, the running application 104 is executed based on the true user file 5US of the logged-in user.

When the logged-in user performs operation to change the set values such as a desktop design, as per the conventional art, the content of a user file 5U stored in the default data directory 6F, i.e., the content of the true user file 5US of the logged-in user, is updated in accordance with the operation. The same applies to the case where the logged-in user performs operation to change the set values of the running application 104.

In response to predetermined operation by the user (Yes in Step #16), the tablet computer 1 displays the log-out screen WN3 (see FIG. 12) (Step #17). When the user presses the "log-out" button (Yes in Step #18), the tablet computer 1 performs log-out processing in the following manner.

The tablet computer 1 deletes the true user file 5US from the default data directory 6F, and moves the dummy user file 5UD from the save directory 6H to the default data directory 6F (Step #19). In short, the dummy user file 5UD is restored. In this way, user data to be referred to is changed from the true user file 5US to the dummy user file 5UD.

In parallel with the processing of Step #19 or before or after the same, the tablet computer 1 replaces the log-in screen file 5GL and the normal screen file 5GS with each other (Step #20). Thereby, preparation for changing the home screen is finished.

The tablet computer 1 restarts the entire or a part of the programs of the operating system 102 (Step #21). Thereby, the log-in screen WN1 is displayed again.

Thereafter, when a user enters his/her user code and password, the tablet computer 1 performs the processing of Step #11 and onward again.

According to this embodiment, even when the existing operating system is used, settings can be changed on a user-by-user basis. The normal home screen WN2 is displayed only when a user code and a password are entered correctly; therefore, the security can be ensured.

This embodiment describes an example in which the tablet computer 1 is used mainly as a stand-alone computer. The present invention is also applicable to a case where the tablet computer 1 is used in coordination with another device via the communication line NW. Descriptions are provided below of a first cooperative form and a second cooperative form as examples in which the tablet computer 1 is used in coordination with the image forming apparatus 2.

[First Cooperative Form]

Figure 14:
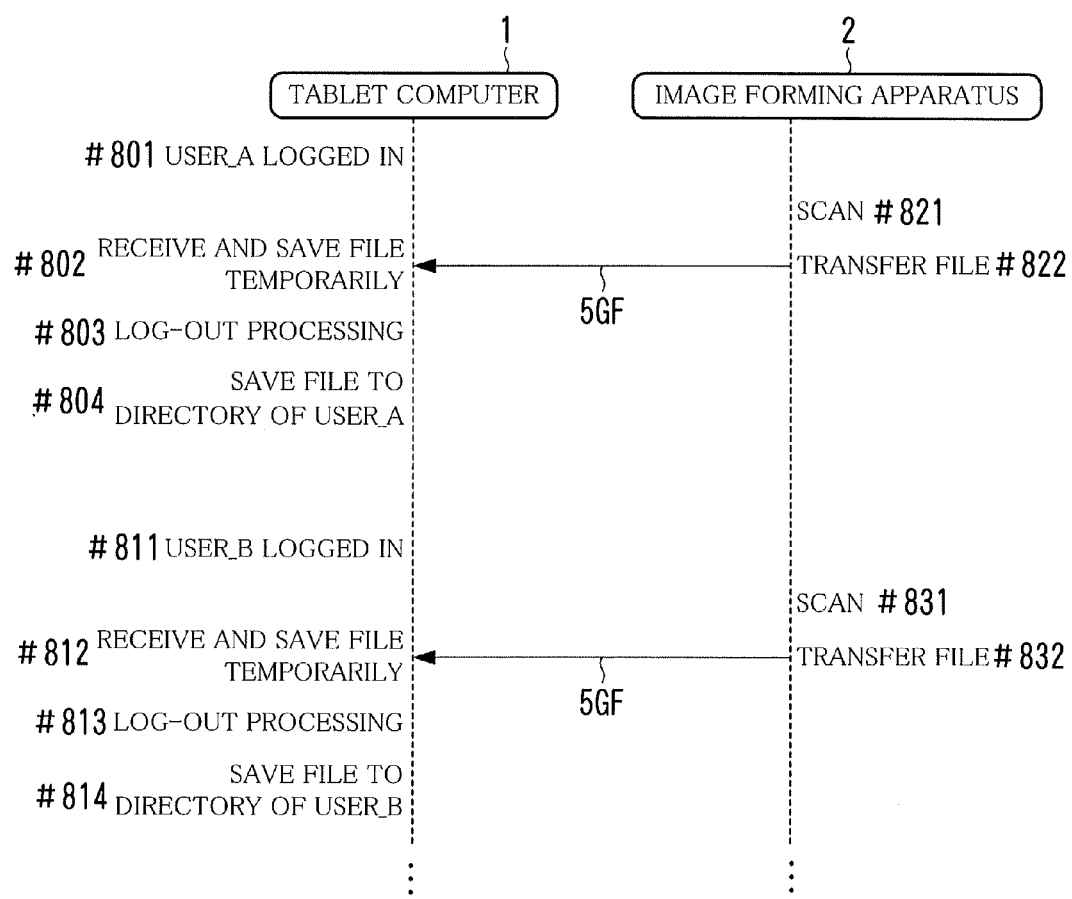
FIG. 14 is a sequence diagram showing an example of the flow of the overall processing performed by a tablet computer and an image forming apparatus according to a first cooperative form.
Figure 15:
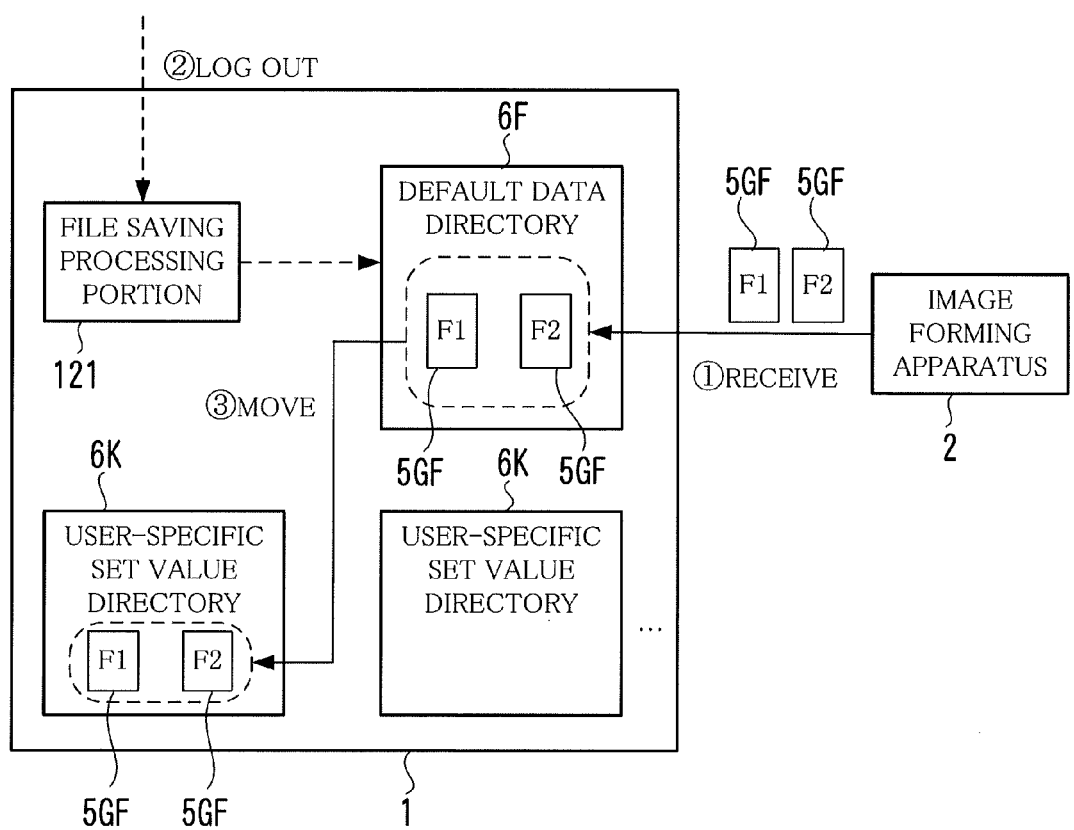
FIG. 15 is a diagram showing a first example of the configuration of functions extended in a tablet computer.

FIG. 14 is a sequence diagram showing an example of the flow of the overall processing performed by the tablet computer 1 and the image forming apparatus 2 according to the first cooperative form; and FIG. 15 is a diagram showing a first example of the configuration of functions extended in the tablet computer 1.

The tablet computer 1 is preset by, for example, an operator of a manufacturer as follows. The tablet computer 1 is so preset that the default data directory 6F (see FIG. 5) is accessible by the image forming apparatus 2 via the communication line NW.

The image forming apparatus 2 has, in an address book thereof, a record of a network address of the default data directory 6F. For example, when the protocol used is Server Message Block (SMB), a common folder path of the default data directory 6F is set as the network address. When the protocol used is WebDAV or File Transfer Protocol (FTP), a Uniform Resource Locator of the default data directory 6F is set as the network address.

The switch users control program 103 is so written that, as the log-out processing, the processing of Step #19 through Step #21 of FIG. 13 and received file saving processing by the file saving processing portion 121 are executed.

The received file saving processing includes moving an image file stored in the default data directory 6F to the user-specific set value directory 6K of the logged-in user, and deleting the image file from the default data directory 6F. The received file saving processing is performed in parallel with the processing of Step #19 and Step #20 or before or after the same. For example, when the logged-in user is the user_A, in response to entry of a log-out command, the tablet computer 1 moves an image file stored in the default data directory 6F to the user-specific set value directory 6K of the user_A, and deletes the image file from the default data directory 6F.

The description goes on to the processing flow by the tablet computer 1 and the image forming apparatus 2 with reference to FIG. 14. The description is provided by taking an example in which the user_A uses the image forming apparatus 2 to scan an image and saves an image file of the image to the tablet computer 1.

The user_A enters his/her user code and password on the touch-sensitive panel display 10e to log into the tablet computer 1 in advance. The user_A then operates the image forming apparatus 2 in the following manner. The user_A places paper on which an image to be converted into image data is depicted in the scanner unit 20e of the image forming apparatus 2. The user_A also selects a network address of the default data directory 6F from among destinations of the address book. The user_A then enters a start command.

In response to this operation, the tablet computer 1 verifies the user code and password entered by the user_A, and allows the user_A to log into the tablet computer 1 (Step #801 of FIG. 14).

In the image forming apparatus 2, the image is read out from the paper, and an image file 5GF is generated (Step #821). The image forming apparatus 2 transfers the image file 5GF to the destination designated, namely, the default data directory 6F of the tablet computer 1 (Step #822). At this time, the image forming apparatus 2 can transfer not only one image file 5GF but also a plurality of image files 5GF to the destination. Note that a series of processing of Step #821 and Step #822 is generally called "SCAN_TO_SMB", "Scan_To_WebDAV", or "SCAN_To_FTP" depending on the protocol used.

The tablet computer 1 receives the image file 5GF and saves the same temporarily to the default data directory 6F as shown in FIG. 15 (Step #802).

In response to log-out operation by the user_A, the tablet computer 1 performs log-out processing (Step #803). At this time, the file saving processing portion 121 moves all of the image files 5GF saved in the default data directory 6F to the user-specific set value directory 6K of the user_A, and deletes the image files 5GF from the default data directory 6F (Step #804).

After that, when the user_B performs the same operation as that described above, the tablet computer 1 and the image forming apparatus 2 perform the same processing (Step #811 through Step #814, Step #831, and Step #832) as that described above. In such a case, however, the image file 5GF is moved, in Step #814, not to the user-specific set value directory 6K of the user_A but to the user-specific set value directory 6K of the user_B.

According to the first cooperative form, one destination can be used in common by a plurality of users, which eliminates the need to register destinations for the individual users in the image forming apparatus 2.

[Second Cooperative Form]

Figure 16:
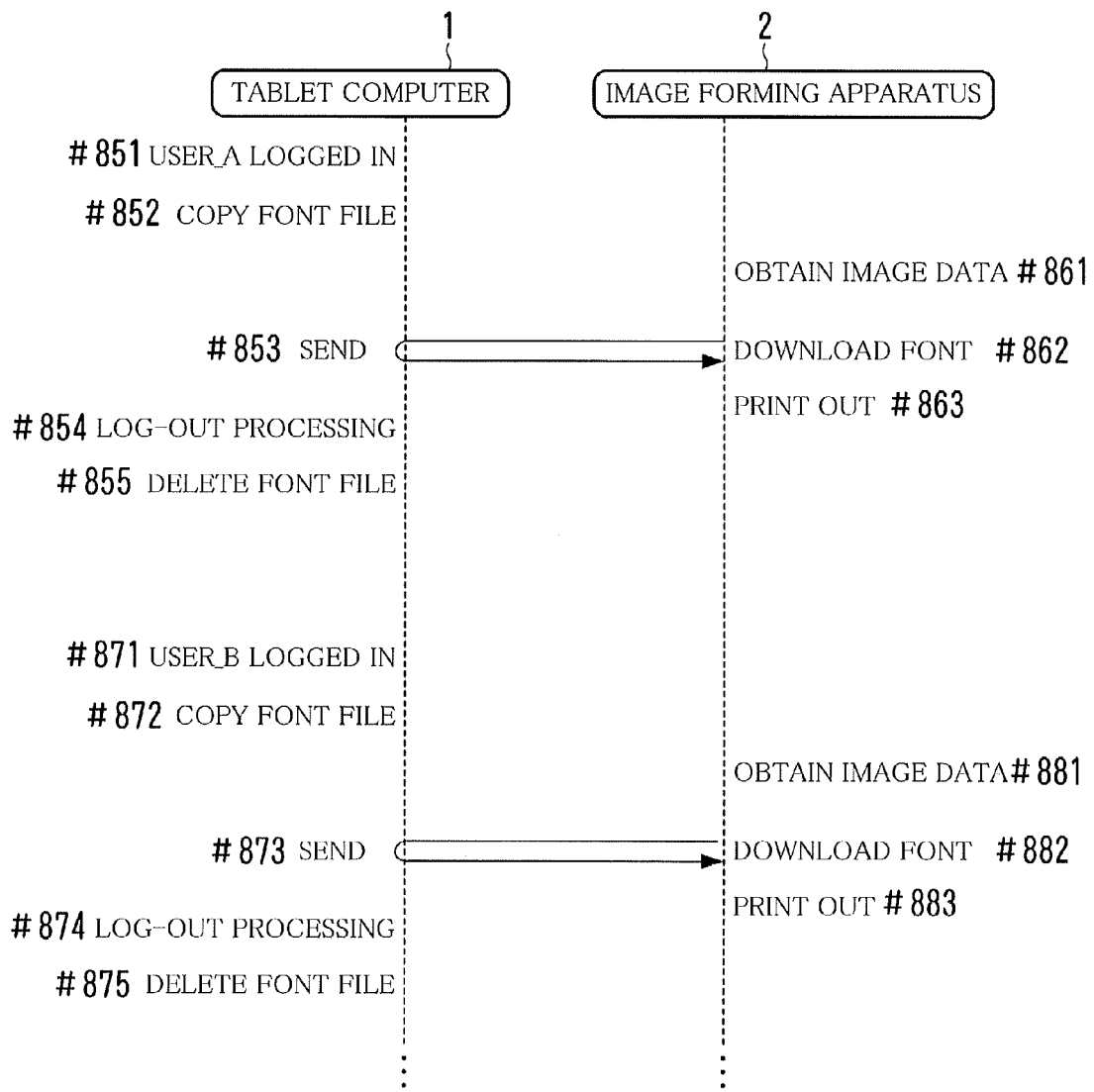
FIG. 16 is a sequence diagram showing an example of the flow of the overall processing performed by a tablet computer and an image forming apparatus according to a second cooperative form.
Figure 17A:
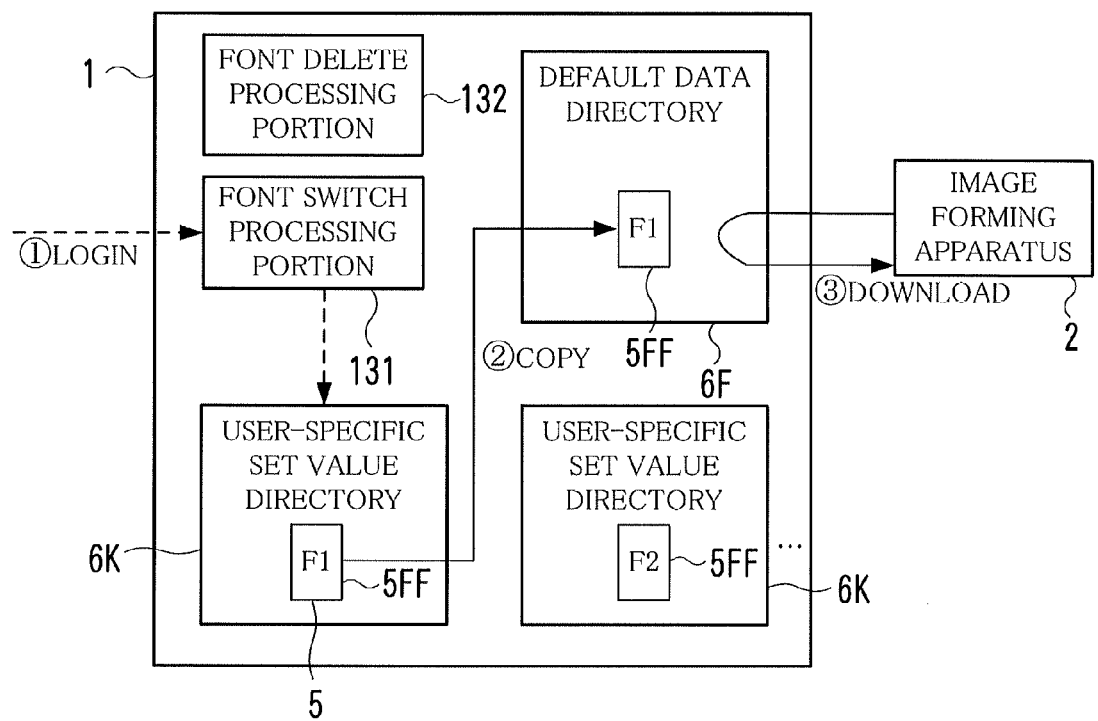
FIGS. 17A and 17B are diagrams showing a second example of the configuration of functions extended in a tablet computer.
Figure 17B:
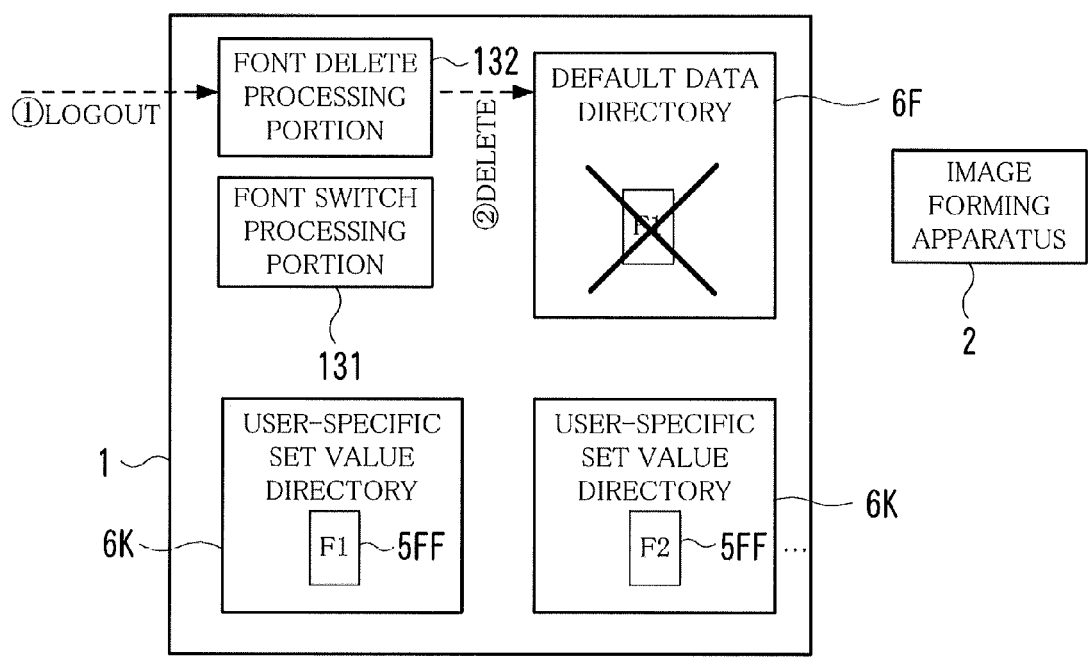

FIG. 16 is a sequence diagram showing an example of the flow of the overall processing performed by the tablet computer 1 and the image forming apparatus 2 according to the second cooperative form; and FIGS. 17A and 17B are diagrams showing a second example of the configuration of functions extended in the tablet computer 2.

In the first cooperative form, the data is sent from the image forming apparatus 2 to the tablet computer 1. In contrast, in the second cooperative form, the data is sent from the tablet computer 1 to the image forming apparatus 2.

The following is a description of an example in which the image forming apparatus 2 downloads font data used for printing from the tablet computer 1, and uses the font data obtained from the tablet computer 1.

As with the first cooperative form, the tablet computer 1 is so preset that the default data directory 6F (see FIG. 5) is accessible by the image forming apparatus 2 via the communication line NW.

Each user is capable of storing, in advance, a font file 5FF of a font that he/she uses in his/her user-specific set value directory 6K. Note that, if necessary, each user obtains a license for the font file 5FF in advance.

The switch users control program 103 is so written that, as the log-in processing, the processing of Step #13 through Step #15 of FIG. 13 and font switch processing by the font switch processing portion 131 are executed, and that, as the log-out processing, the processing of Step #19 through Step #21 and font delete processing by the font delete processing portion 132 are executed.

The font switch processing includes copying the font file 5FF stored in the user-specific set value directory 6K of the logged-in user to the default data directory 6F. The font delete processing includes deleting the font file 5FF from the default data directory 6F.

The image forming apparatus 2 is so configured that, if the default data directory 6F of the tablet computer 1 stores therein the font file 5FF, the font file 5FF is used to form characters.

The description goes on to the processing flow by the tablet computer 1 and the image forming apparatus 2 with reference to FIG. 16. The description is provided by taking an example in which the user_A uses the image forming apparatus 2 to print out a document.

The user_A enters his/her user code and password on the touch-sensitive panel display 10*e* to log into the tablet computer 1 in advance. The user_A then operates the image forming apparatus 2 in the following manner.

The user_A prepares data of a document to be printed, and enters the document data into the image forming apparatus 2. An example of the document data is a file in Portable Document Format (PDF) format. The user_A then selects an option to use a font in the tablet computer 1. The user_A then enters a start command.

In response to this operation, the tablet computer 1 verifies the user code and password entered by the user_A, and allows the user_A to log into the tablet computer 1 (Step #851 of FIG. 16). The font switch processing portion 131 copies the font file 5FF stored in the user-specific set value directory 6K of the user_A to the default data directory 6F as shown in FIG. 17A (Step #852).

In the image forming apparatus 2, when the document data is obtained (Step #861), access is made to the tablet computer 1, so that the font file 5FF is downloaded from the default data directory 6F based on a protocol such as SMB, WebDAV, or FTP (Step #862 and Step #853). The image forming apparatus 2 then forms an image of a text part in the document based on the font file 5FF, and prints the image onto paper (Step #863).

When the user_A performs log-out operation by entering a predetermined command on the touch-sensitive panel display 10*e* and others, the tablet computer 1 performs log-out processing (Step #854). At this time, the font delete processing portion 132 deletes the font file 5FF from the default data directory 6F shown in FIG. 17B (Step #855).

After that, when the user_B performs the same operation as that described above, the tablet computer 1 and the image forming apparatus 2 perform the same processing (Step #871 through Step #875, and Step #881 through Step #883) as that described above. In such a case, however, the font file 5FF stored in the user-specific set value directory 6K of the user_B is copied, in Step #872, to the user-specific set value directory 6K.

According to the second cooperative form, a variety of fonts can be used even in an image forming apparatus having a low-capacity hardware resource, in particular, a low-capacity storage. Further, a network address used for downloading the font file 5FF can be used in common by a plurality of users in the second cooperative form.

The processing discussed in the first cooperative form may be performed in the second cooperative form.

The foregoing embodiment and cooperative forms provide a description of the case where the switch users control program 103 is applied to the tablet computer 1. The present invention is applicable also to another type of device, in particular, a mobile information terminal. The present invention is applicable, for example, to a smartphone, a Personal Digital Assistant (PDA), or a terminal designed specifically for electronic book. The present invention is suitably applied, in particular, to a device having a non-multiuser operating system.

The following arrangement is also possible: The switch users control program 103 is configured to have a function to generate the account file 5T, the true user file 5US, the log-in screen file 5GL, the account directory 6T, the user-specific set value directory 6K, the save directory 6H, and the backup directory 6BU. Then, a purchaser of the tablet computer 1 is capable of preparing the files and directories by himself/herself.

In the foregoing embodiment and cooperative forms, for simplicity of explanation, data to be referred to by the operating system 102 and the application 104 is stored in one directory, namely, the default data directory 6F. Instead of this, however, the storage location of such data may be changed appropriately depending on the specifications of the operating system 102.

As shown in FIG. 5, data (system setting data 5Ua) on set values of the operating system 102 and data (application setting data 5Ub) on set values of each of the applications 104 are colleted in one user file 5U for management. Instead of this, such data is sometimes managed separately in different files depending on the specifications of the operating system 102.

In the foregoing embodiment and cooperative forms, the tablet computer 1 manages storage regions of files (data) in directories. Instead of this, such storage regions may be managed based on addresses of the flash memory 10*c*.

In the foregoing embodiment and cooperative forms, the switch users control program 103 stays resident even after being started. Instead of this, however, it is possible to restart the switch users control program 103 at a time when a user logs out of the tablet computer 1.

In the foregoing embodiment and cooperative forms, instead of the true user file 5US, the symbolic link 5L thereof is stored in the default data directory 6 in some cases. Likewise, a symbolic link of the dummy user file 5UD may be stored in the default data directory 6F instead of the dummy user file 5UD.

In the foregoing embodiment and cooperative forms, the true user file 5US is prepared in the flash memory 10*c*. However, the true user file 5US may be prepared in another device. For example, the true user file 5US may be prepared in a so-called online storage, and the true user file 5US may be used after being downloaded from the online storage.

It is to be understood that the configurations of the intranet 4 and the tablet computer 1, the constituent elements thereof, the content and order of the processing, the configuration of data, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A mobile information terminal comprising:
   a normal setting data storage device configured to store temporary setting data in advance as normal setting data that is related to settings;
   a separate setting data storage device configured to store, for each user, separate setting data that is related to individual settings in association with an identifier of said each user; and
   a hardware processor configured:
   to perform specific processing based on the normal setting data stored in the normal setting data storage device;
   to receive the identifier; and
   to perform replacement processing for moving the temporary setting data to a save storage device and storing into the normal setting data storage device, as the normal setting data, the separate setting data stored in association with the identifier received.

2. The mobile information terminal according to claim 1, comprising
   a normal received data storage device configured to store data received from another device,
   a separate received data storage device prepared for said each user, and
   the hardware processor further configured to move, when a first command is entered, the received data stored in the normal received data storage device to the separate received data storage device for a user corresponding to the identifier received.

3. The mobile information terminal according to claim 1, comprising
   a normal transmission target data storage device configured to store transmission target data,
   a separate transmission target data storage device prepared for said each user, and
   the hardware processor further configured to store data stored in the separate transmission target data storage device for a user corresponding to the identifier received into the normal transmission target data storage device as the transmission target data,
   a transmitter configured to send the transmission target data stored in the normal transmission target data storage device to another device, and
   the hardware processor further configured to delete, when a second command is entered, the transmission target data from the normal transmission target data storage device.

4. The mobile information terminal according to claim 1, wherein, the hardware processor performs, as the specific processing, processing for displaying a selection screen on which one of applications is selected after the replacement processing.

5. The mobile information terminal according to claim 1, comprising
   the hardware processor further configured:
   to perform, when a third command is entered and any one of applications runs, ending processing for finishing the application running, and
   to perform restore processing for deleting the separate setting data from the normal setting data storage device and storing the temporary setting data stored in the save storage device into the normal setting data storage device.

6. The mobile information terminal according to claim 1, wherein the hardware processor displays an entry screen on a display unit and receives information entered on the entry screen as the identifier.

7. The mobile information terminal according to claim 1, wherein the hardware processor stores, into the normal setting data storage device, a symbolic link of the separate setting data instead of the separate setting data itself.

8. An information management system comprising:
   an image forming apparatus; and
   a mobile information terminal configured to perform communication with the image forming apparatus; wherein
   the mobile information terminal includes
   a normal setting data storage device configured to store temporary setting data in advance as normal setting data that is related to settings,
   a separate setting data storage device configured to store, for each user, separate setting data that is related to individual settings in association with an identifier of said each user, and
   a hardware processor configured:
   to perform specific processing based on the normal setting data stored in the normal setting data storage device;
   to receive the identifier; and
   to perform replacement processing for moving the temporary setting data to a save storage device and storing into the normal setting data storage device, as the normal setting data, the separate setting data stored in association with the identifier received.

9. The information management system according to claim 8, wherein
   the mobile information terminal includes a normal received data storage device configured to store data received from another device,
   the image forming apparatus includes a transmitter configured to send data to the normal received data storage device,
   the hardware processor further configured:
   to store the data received from the image forming apparatus as the received data into the normal received data storage device,
   to receive a user identifier, and
   to move, when a predetermined command is entered, the data stored in the normal received data storage device to a personal storage region corresponding to the user identifier received.

10. The information management system according to claim 8, wherein
    the mobile information terminal includes
    a normal transmission target data storage device configured to store transmission target data,
    a separate transmission target data storage device prepared for said each user, and
    the hardware processor configured to store data stored in the separate transmission target data storage device for a user corresponding to the identifier received into the normal transmission target data storage device as the transmission target data, the image forming apparatus includes a hardware processor configured to obtain the transmission target data stored in the normal transmission target data storage device, and the hardware processor in the mobile information terminal is further configured to delete, when a second command is entered, the transmission target data from the normal transmission target data storage device.

11. A method for sharing a mobile information terminal by a plurality of users, the method comprising:

storing, in a normal setting data storage device, temporary setting data in advance as normal setting data that is related to settings;

storing, in a separate setting data storage device, for each user, separate setting data that is related to individual settings in association with an identifier of said each user;

causing the mobile information terminal to perform specific processing based on the normal setting data stored in the normal setting data storage device;

causing the mobile information terminal to perform processing for receiving the identifier; and causing the mobile information terminal to perform replacement processing for moving the temporary setting data to a save storage device and storing into the normal setting data storage device, as the normal setting data, the separate setting data stored in association with the identifier received.

12. The method according to claim 11, comprising providing, in the mobile information terminal, a normal received data storage device configured to store data received from another device, and a separate received data storage device prepared for said each user, and causing the mobile information terminal to perform transfer processing for moving, when a first command is entered, the received data stored in the normal received data storage device to the separate received data storage device for a user corresponding to the identifier received.

13. The method according to claim 11, comprising providing, in the mobile information terminal, a normal transmission target data storage device configured to store transmission target data, and a separate transmission target data storage device prepared for said each user, causing the mobile information terminal to perform transmission preparation processing for storing data stored in the separate transmission target data storage device for a user corresponding to the identifier received into the normal transmission target data storage device as the transmission target data, causing the mobile information terminal to perform transmission processing for sending the transmission target data stored in the normal transmission target data storage device to another device, and causing the mobile information terminal to perform deletion processing for deleting, when a second command is entered, the transmission target data from the normal transmission target data storage device.

14. A non-transitory computer-readable storage medium storing thereon a computer program used in a mobile information terminal, the mobile information terminal including a normal setting data storage device configured to store temporary setting data in advance as normal setting data that is related to settings, and a separate setting data storage device configured to store, for each user, separate setting data that is related to individual settings in association with an identifier of said each user, the computer program causing the mobile information terminal to perform processing comprising:

receiving processing for receiving the identifier;

replacement processing for moving the temporary setting data to a save storage device and storing into the normal setting data storage device, as the normal setting data, the separate setting data stored in association with the identifier received; and specific processing based on the normal setting data stored in the normal setting data storage device.

15. The non-transitory computer-readable storage medium according to claim 14, wherein the mobile information terminal further includes a normal received data storage device configured to store data received from another device, and a separate received data storage device prepared for said each user, and the computer program causes the mobile information terminal to perform transfer processing for moving, when a first command is entered, the received data stored in the normal received data storage device to the separate received data storage device for a user corresponding to the identifier received.

16. The non-transitory computer-readable storage medium according to claim 14, wherein the mobile information terminal further includes a normal transmission target data storage device configured to store transmission target data, and a separate transmission target data storage device prepared for said each user, and the computer program causes the mobile information terminal to perform transmission preparation processing for storing data stored in the separate transmission target data storage device for a user corresponding to the identifier received into the normal transmission target data storage device as the transmission target data, transmission processing for sending the transmission target data stored in the normal transmission target data storage device to another device, and deletion processing for deleting, when a second command is entered, the transmission target data from the normal transmission target data storage device.

17. The non-transitory computer-readable storage medium according to claim 14, wherein the specific processing is processing for displaying a selection screen on which one of applications is selected, and the specific processing is performed after the replacement processing.

18. The non-transitory computer-readable storage medium according to claim 14, wherein the computer program causes the mobile information terminal to perform ending processing for finishing, when a third command is entered and any one of applications runs, the application running, and restore processing for deleting the separate setting data from the normal setting data storage device and storing the temporary setting data stored in the save storage device into the normal setting data storage device.

19. The non-transitory computer-readable storage medium according to claim 14, wherein the receiving processing is processing for displaying an entry screen on a display unit and receiving, as the identifier, information entered on the entry screen.

20. The non-transitory computer-readable storage medium according to claim 14, wherein the computer program causes the mobile information terminal to perform, as the replacement processing, processing for storing, into the normal setting data storage device, a symbolic link of the separate setting data instead of the separate setting data itself.

* * * * *